United States Patent [19]
Morlion et al.

[11] Patent Number: 5,800,198
[45] Date of Patent: Sep. 1, 1998

[54] CONNECTOR ASSEMBLY

[75] Inventors: Danny Morlion, St. Amandsberg; Luc Jonckheere, Dilbeek; Jan Peter Karel Van Koetsem, Zwijndrecht, all of Belgium

[73] Assignee: Framatome Connectors International Tour Framatome, Courbevoie, France

[21] Appl. No.: 765,346

[22] PCT Filed: Jun. 20, 1995

[86] PCT No.: PCT/EP95/02402

§ 371 Date: Dec. 12, 1996

§ 102(e) Date: Dec. 12, 1996

[87] PCT Pub. No.: WO96/00917

PCT Pub. Date: Jan. 11, 1996

[30] Foreign Application Priority Data

Jun. 28, 1994 [NL] Netherlands ............... 9401073

[51] Int. Cl.⁶ .................................................. H01R 13/62
[52] U.S. Cl. ........................ 439/372; 439/343; 439/701
[58] Field of Search ................................ 439/350, 351, 439/352–358, 372, 701, 343

[56] References Cited

U.S. PATENT DOCUMENTS

| | | | |
|---|---|---|---|
| 4,715,820 | 12/1987 | Andrews, Jr. et al. | 439/59 |
| 4,786,259 | 11/1988 | Paul | 439/358 X |
| 5,281,161 | 1/1994 | Kanai | 439/357 |
| 5,312,276 | 5/1994 | Hnatuck et al. | 439/701 X |

FOREIGN PATENT DOCUMENTS

| | | |
|---|---|---|
| 0 061 243 | 9/1982 | European Pat. Off. . |
| 0 108 477 | 5/1984 | European Pat. Off. . |
| 0 262 432 | 4/1988 | European Pat. Off. . |
| 3428702 A1 | 2/1986 | Germany . |
| 43 29 824 A1 | 3/1994 | Germany . |

OTHER PUBLICATIONS

Patent Abstracts of Japan, vol. 14, No. 195 (P–1039) (4138) 20 Apr. 1990 & JP, A, 02 039 111 (NEC Corporation).

Primary Examiner—Khiem Nguyen
Attorney, Agent, or Firm—Perman & Green, LLP

[57] ABSTRACT

A connector assembly for interconnecting optical and/or electrical conductors, comprising a first connector part (1) for one or more first conductors, a second connector part (7) for one or more second conductors, and a coupling auxiliary piece (13) adapted to be attached to a support plate (14) or the like. The coupling auxiliary piece (13) comprises a first receiving space (15) for the first connector part (1), and at the side opposite of the first receiving space (15) a second receiving space (19) for the second connector part (7). The receiving spaces are adapted to support each connector part independent of the other connector part and the coupling auxiliary piece (13) comprises a passage (22) for the second connector part (7) debouching into the first receiving space (15). The second connector part is correspondingly sized and shaped to be inserted into a housing (2) of the first connector part (1) with an insertion end to establish a connection between the respective conductors, and the second connector part (2) in its position received in the coupling auxiliary piece projects through said passage into the first receiving space (15) and is inserted into the housing (2) of the first connector part (1) when said first connector part is in its position received in the coupling auxiliary piece.

7 Claims, 6 Drawing Sheets

FIG. I

CONNECTOR ASSEMBLY

The invention relates to a connector assembly for interconnecting optical and/or electrical conductors, comprising a first connector part for one or more first conductors and a second connector part for one or more second conductors, said second connector part being adapted to be inserted into a housing of the first connector part with an insertion end to establish a connection between the respective conductors.

Such a connector assembly is disclosed in EP-A-0 602 726. FIG. 6 of this document shows an embodiment wherein the second connector part projects through an opening in a printed circuit board or frame part. When in this embodiment one connector part is withdrawn from the other connector part, this other connector part is no longer held at its location on the printed circuit board or frame part.

The invention aims to provide an improved connector assembly of the above-mentioned type.

To this end the connector assembly of the invention is characterized by a coupling auxiliary piece adapted to be attached to a support plate or the like, said coupling auxiliary piece comprising means for receiving and supporting each connector part independent of the other connector part, wherein the second connector part in its position received in the coupling auxiliary part is inserted into the first connector part if said first connector part is received in the coupling auxiliary piece.

In this manner a connector assembly is obtained wherein each connector part is held at its location on the printed circuit board, the frame part or other support plate of this type by the coupling auxiliary piece independently of the other connector part. Decoupling a connection between both connector parts is thereby very simple.

The invention will be further explained by reference to the drawing in which an embodiment is schematically shown.

Figure 1:
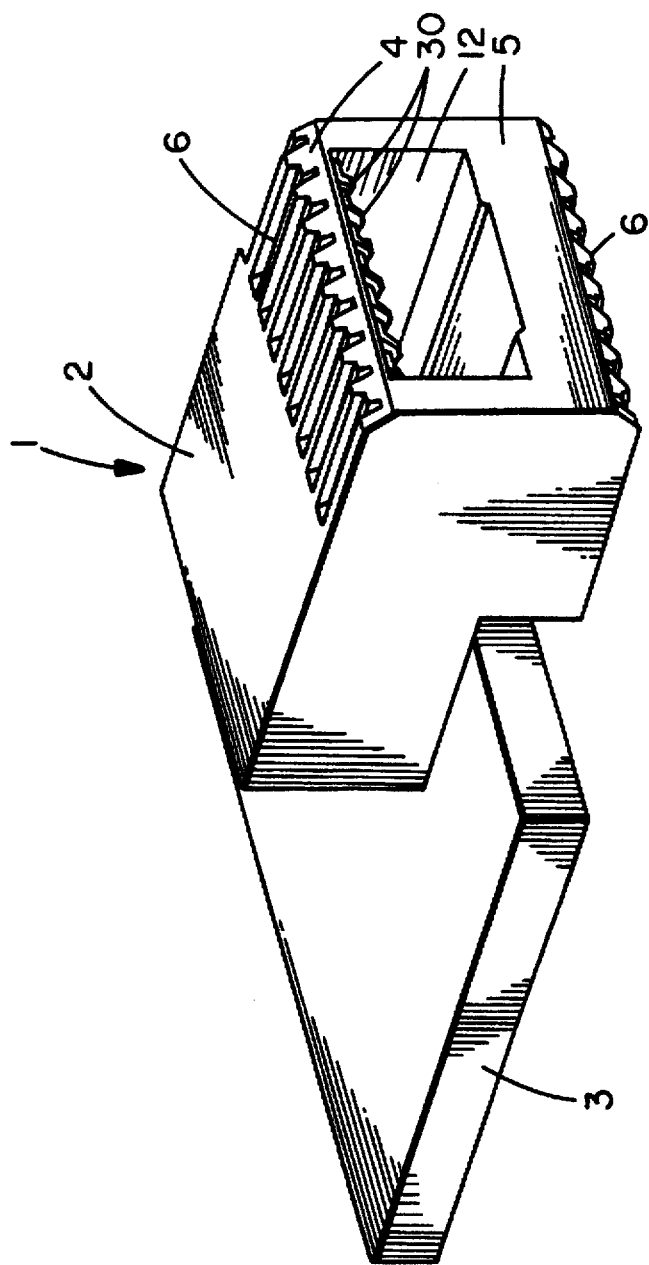
FIG. 1 shows a perspective view of a first connector part of an embodiment of the connector assembly according to the invention.

FIG. 1 shows a first connector part 1 of a connector assembly for interconnecting optical and/or electrical conductors. This connector part 1 comprises a housing 2 made of plastic material and attached to an end edge of a printed circuit board 3 schematically shown. As further described in the above-mentioned European patent application EP-A-0 602 726 an alignment piece not further shown for the optical/electrical conductors is received in this printed circuit board, wherein each conductor comprises a contact pad located in the upper surface of the alignment piece. For a detailed description reference is made to this European patent application. Two opposite outer walls 4, 5 of the housing 2 of the connector part 1 are provided with slots 6 with a predetermined profile.

Figure 2:
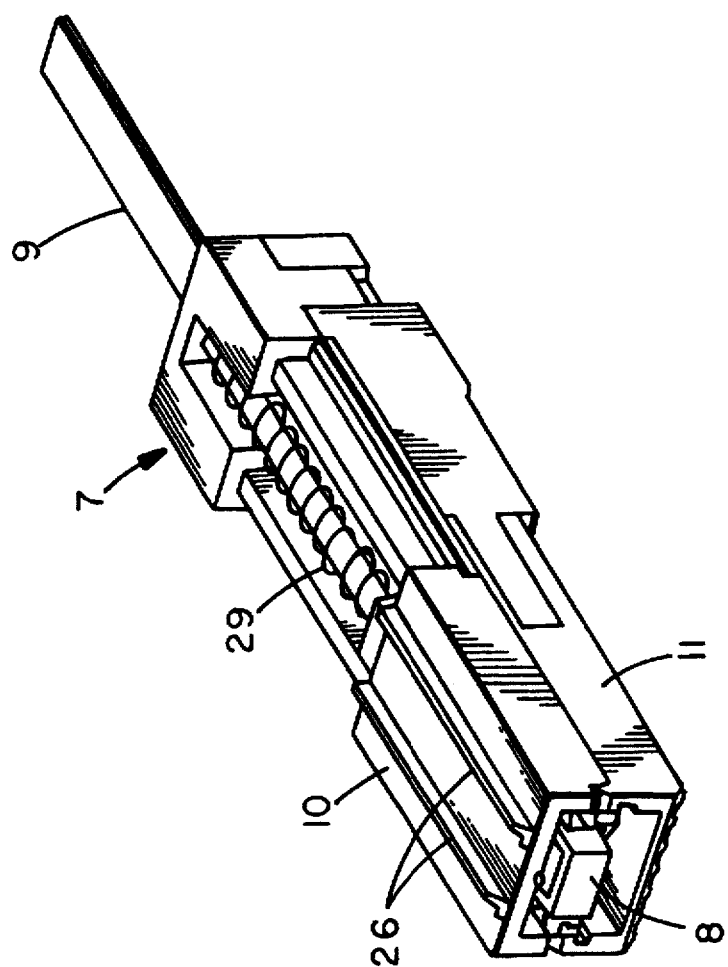
FIG. 2 shows a perspective view of the second connector part of the embodiment of the connector assembly of FIG. 1.

The connector assembly described comprises a second connector part 7 shown in a perspective view in FIG. 2. This second connector part 7 is provided with an alignment piece 8, optical conductors of a flat cable 9 not further shown being attached in this alignment piece in the embodiment described. The connector part 7 is provided with a slidable cap 10 guided on a housing 11 of the second connector part 7 movable forward and backward. In the position shown in FIG. 2 the cap 10 protects the contact pads of the conductors located in the upper surface of the alignment piece 8. The connector part 7 is also described in further detail in European patent application EP-A-0 602 726. The connector part 7 is adapted to be inserted with its free insertion end into an opening 12 of the housing 2 of the connector part 1, wherein in the fully inserted position the respective conductors are interconnected through their corresponding contact pads.

Figure 3:
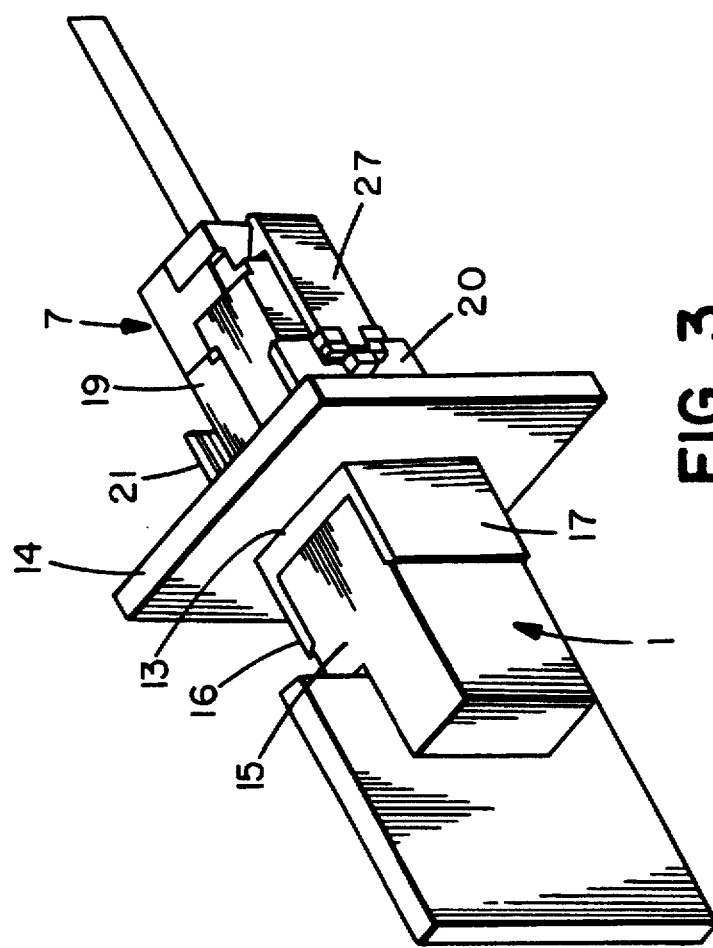
FIG. 3 shows both connector parts of FIGS. 1 and 2 in coupled position together with the corresponding coupling auxiliary piece.

FIG. 3 shows both connector parts 1, 7 in the coupled position, wherein both connector parts 1, 7 are received in a coupling auxiliary piece 13 attached on a support plate 14 only a small part thereof being shown. This support plate 14 can for example be a printed circuit board, such as a backpanel, or a frame part. The attachment on the support plate 14 may for example occur by means of lips formed on the coupling auxiliary piece 13 and shown in FIG. 6.

Figure 4:
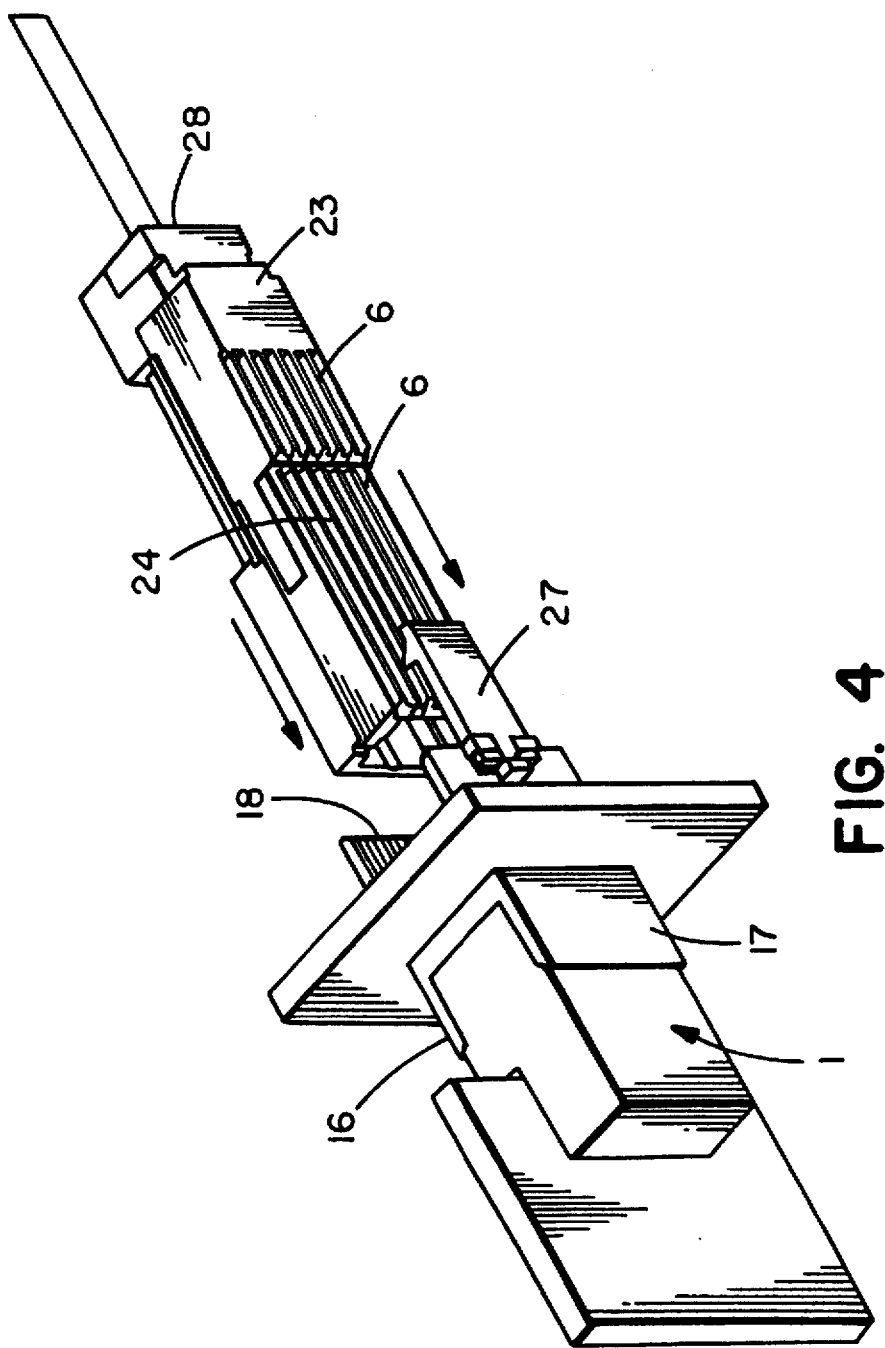
FIG. 4 shows a perspective view of the connector assembly of FIG. 3, wherein the second connector part is decoupled.
Figure 5:
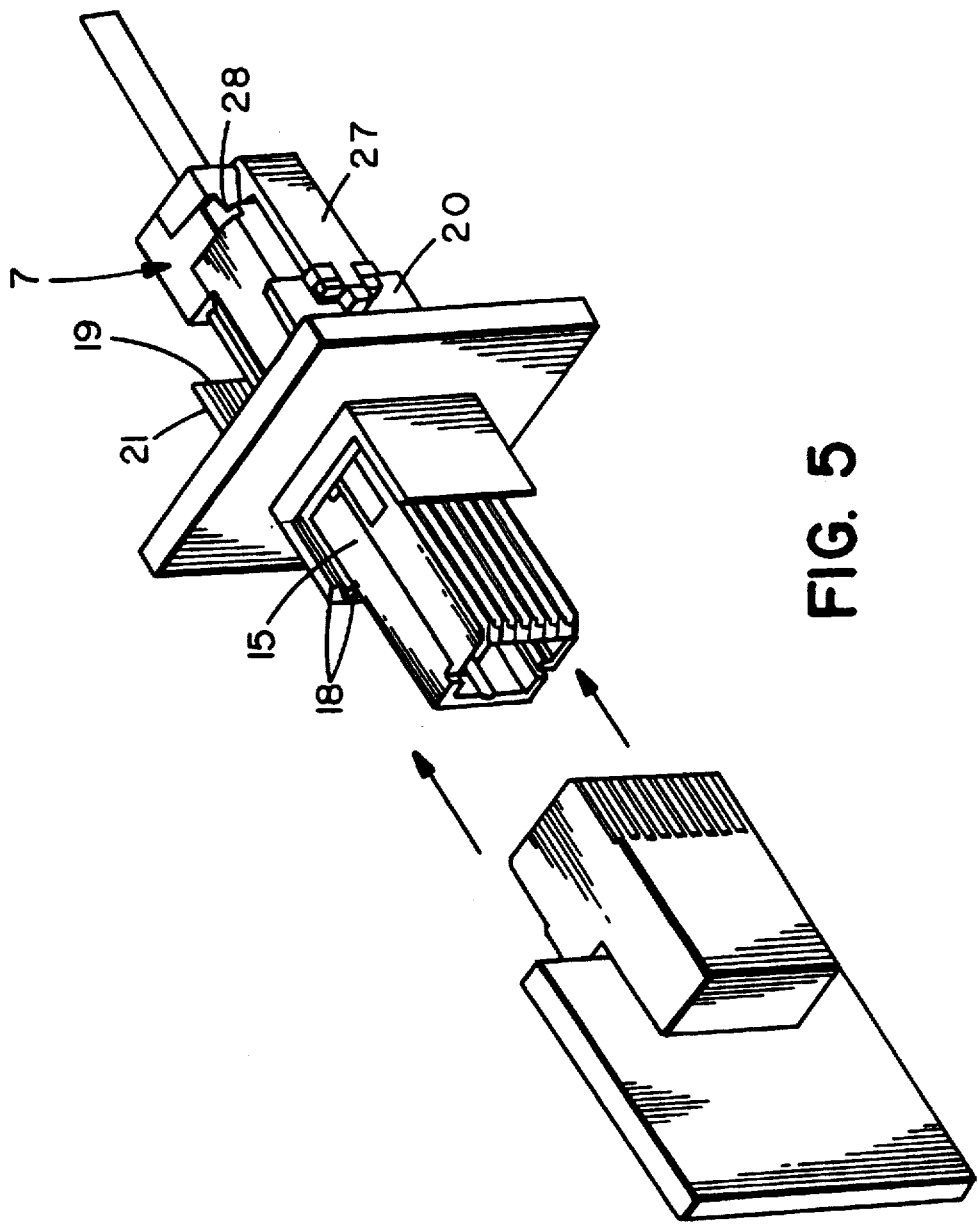
FIG. 5 shows a perspective view corresponding with FIG. 4, wherein the first connector part is decoupled.
Figure 6:
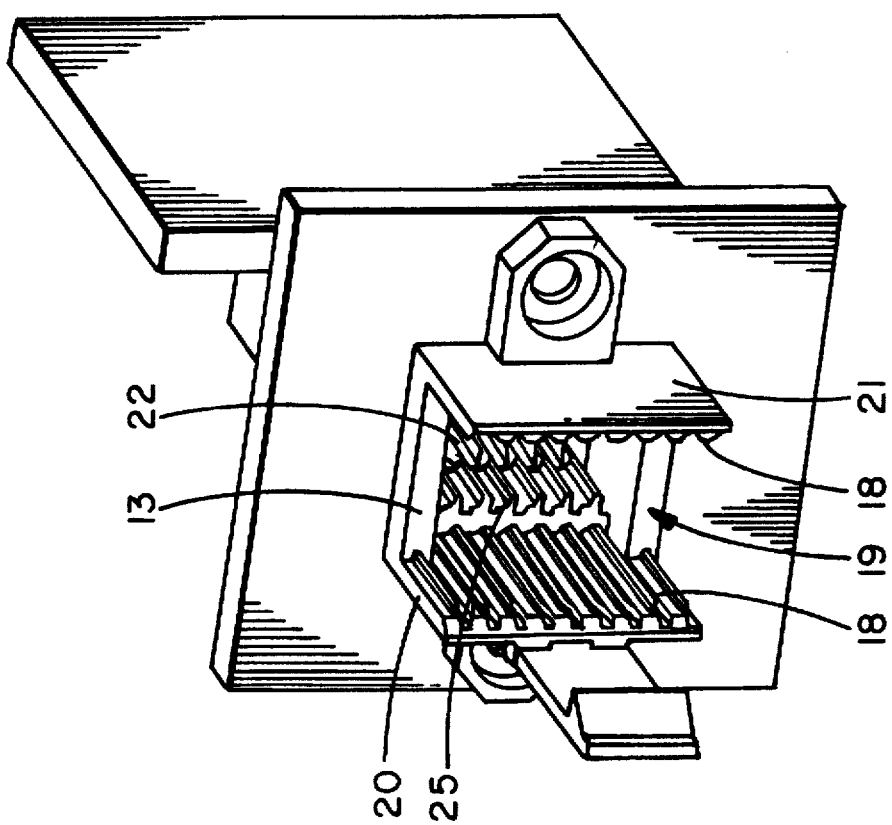
FIG. 6 shows a perspective view of the coupling auxiliary piece of the connector assembly according to the invention at the side of the second connector part.

As shown in FIGS. 3–6, the coupling auxiliary piece 13 is provided with a first receiving space 15 for the first connector part 1, having two opposite walls 16, 17. These walls 16, 17 are provided with ribs 18 at the inner side, said ribs 18 engaging the slots 6 of the outer walls 4, 5 of the housing 2 when the connector part 1 is inserted into the receiving space 15. At the side opposite of the receiving space 15 the coupling auxiliary piece 13 comprises a second receiving space 19 for the second connector part 7. The receiving space 19 also has two opposite walls 20, 21, said walls having also ribs 18 in the embodiment shown. FIG. 6 shows a view of the coupling auxiliary piece 13 from the side of the second receiving space 19, showing that the receiving space 19 is in connection with the first receiving space 15 through a passage 22 for the second connector part 7.

In FIG. 4 only the first connector part 1 is received in the receiving space 15 and the connector part 7 is not coupled with the first connector part 1. The walls 16, 17 of the receiving space 15 engage the outer walls of the housing 2 of the first connector part 1 so that this connector part 1 is supported by the coupling auxiliary piece 13 independently of the second connector part 7.

In FIG. 5 only the second connector part 7 is inserted into the receiving space 19, wherein the insertion end of the second connector part 7 extends through the passage 22 and the first receiving space 15 out of the coupling auxiliary piece 13. The wall 20 of the receiving space 19 engages an outer wall 23 of the connector part 7 which in this case is partially provided with slots 6. The ribs 18 of the wall 20 engage into said slots 6. The front part of the connector part 7 has an outer wall 24 also being provided with slots 6 cooperating with ribs 25 in the passage 22 shown in FIG. 6. The cap 10 has two ribs 26 cooperating with slots of the wall 21 and 16, respectively, formed between the ribs 18.

When the connector part 7 is fully inserted into the receiving space 19, a locking hook 27 can engage behind a shoulder 28 of the connector part 7 so that the connector part 7 is locked in the coupling auxiliary piece 13. The locking hook 27 is rotatably mounted on the wall 20 of the coupling auxiliary piece 13.

As shown in FIG. 5, the connector part 1 can be decoupled from the connector part 7 wherein the connector part 7 remains received and supported in the coupling auxiliary piece 13 independently of the connector part 1. When the connector part 1 is decoupled from the connector part 7, the cap 10 is in its front position in which the alignment piece is protected. When the connector part 1 is inserted into the receiving space 15, the cap 10 is pushed backwards into the position shown in FIG. 3 against the operation of a spring 29 schematically shown in FIG. 2.

In the coupled position of the connector parts 1, 7 according to FIG. 3, the outer wall 24 engages with its slots 6 between slots formed between ribs 30 at the inner side of the opening 12 of the housing 2.

The cooperation between the above-mentioned ribs and slots guarantees in a usual manner that the connector parts 1, 7 can only be inserted into the coupling auxiliary piece 13 and can only be coupled with each other in the correct position.

From the foregoing it will be clear that the invention provides a connector assembly wherein the coupling auxiliary piece 13 provides the possibility to decouple the first or second connector part 1 or 7 if necessary, wherein the other connector part 7 or 1 remains supported by the coupling auxiliary piece 13 independently of the connector part 1 or 7.

The invention is not restricted to the above-described embodiment which can be varied in a number of ways within the scope of the invention.

We claim:

1. Connector assembly for interconnecting optical and/or electrical conductors, comprising a first connector part (1) for one or more first conductors, a second connector part (7) for one or more second conductors, and a coupling auxiliary piece (13) adapted to be attached to a support plate (14) or the like, wherein the coupling auxiliary piece (13) comprises a first receiving space (15) for the first connector part (1), and at the side opposite of the first receiving space (15) a second receiving space (19) for the second connector part (7), wherein said receiving spaces are correspondingly sized and shaped to support each connector part independently of the other connector part, characterized in that the coupling auxiliary piece (13) comprises a passage (22) for the second connector part (7) debouching into the first receiving space (15), wherein said second connector part is correspondingly sized and shaped to be inserted into a housing (2) of the first connector part (1) with an insertion end to establish a connection between the respective conductors, and the second connector part (7) in its position received in the coupling auxiliary piece projects into and completely through said passage of said auxiliary piece and into the first receiving space (15) and is inserted into the housing (2) of the first connector part (1) when said first connector part is in its position received in the coupling auxiliary piece.

2. A connector assembly according to claim 1, characterized in that said first receiving space (15) has two opposite walls (16, 17) adapted to engage corresponding outer walls (4, 5) of the housing of the first connector part.

3. A connector assembly according to claim 2, characterized in that at least one of the walls (16, 17) of the first receiving space (15) comprises ribs (18) adapted to cooperate with correspondingly shaped slots (6) of an outer wall (4, 5) of the housing (2) of the first connector part (1).

4. A connector assembly according to claim 2, characterized in that the coupling auxiliary piece (13) at the side opposite of the first receiving space (15) comprises a locking hook (27) for locking the second connector part in its position received in the coupling auxiliary piece.

5. A connector assembly according to claim 4, characterized in that said second receiving space (19) has two opposite walls (20, 21) adapted to engage corresponding outer walls of the second connector part (7).

6. A connector assembly according to claim 5, characterized in that the locking hook (27) is rotatably mounted on a wall (20) of the second receiving space (19).

7. A connector assembly according to claim 5, characterized in that at least one of the walls of the passage (22) and/or the second receiving space (19) comprises ribs (25) adapted to cooperate with correspondingly shaped slots (6) in an outer wall (24) of the second connector part (7).

* * * * *